May 15, 1928.

E. TYDEN 1,669,433

EXHAUST CONNECTION FOR DRY PIPE SPRINKLER SYSTEMS

Original Filed April 9, 1925

Witness
N. R. McKnight

Inventor.
Emil Tyden.
by Burton & Burton
his Attorneys.

Patented May 15, 1928.

1,669,433

UNITED STATES PATENT OFFICE.

EMIL TYDEN, OF EVANSTON, ILLINOIS.

EXHAUST CONNECTION FOR DRY-PIPE SPRINKLER SYSTEMS.

Application filed April 9, 1925, Serial No. 21,882. Renewed February 20, 1928.

The purpose of this invention is to provide an improved construction in a dry pipe sprinkler system for accelerating the operation of the system for discharge of water at the sprinkler head upon the opening of any single sprinkler head or like occasion for admission of water to the system. It consists in the elements and features of construction shown and described as indicated in the claims.

In the drawings:

Figure 3 is a detail section of the accelerator valve seen in Figure 1, on a larger scale than Figure 1.

Figure 1:
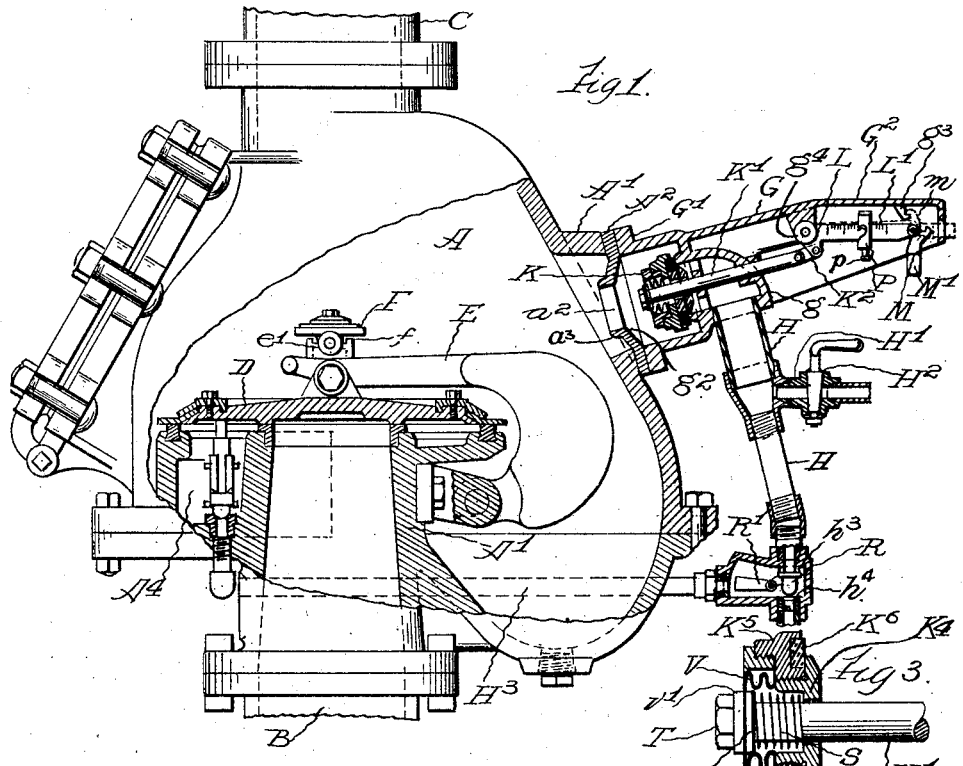
Figure 1 is a partly sectional view comprising a dry pipe valve of a sprinkler system and the appurtenances thereto, constituting this invention, section being made axial with respect to the inlet and outlet connections of the dry pipe valve casing.
Figure 2:
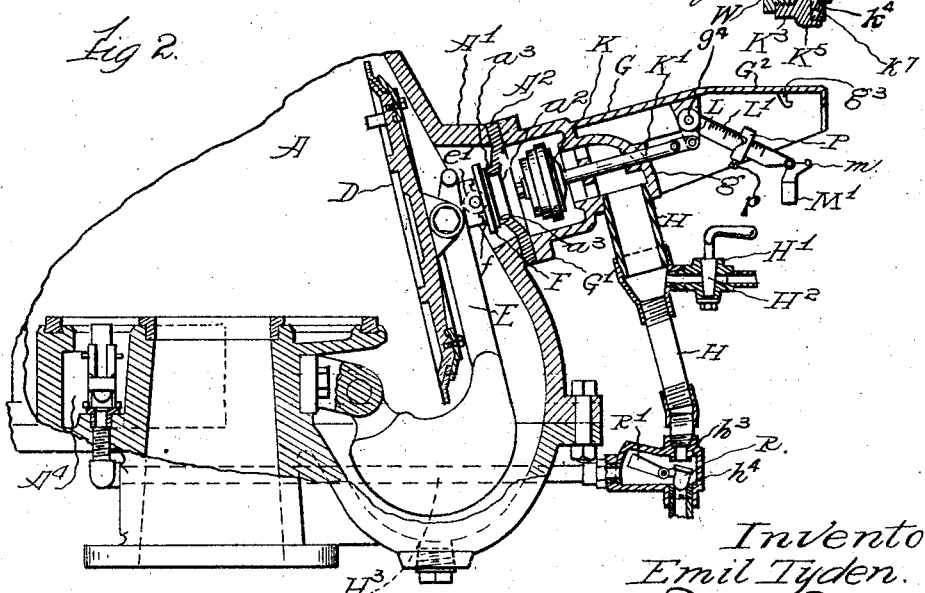
Figure 2 is a view similar to Figure 1 showing the operating parts in different position from that of Figure 1.

In the construction shown in the drawings, A is the main valve casing of a dry pipe sprinkler system having water supply connection indicated by the pipe terminal, B, and water delivery connection with the air pressure region of the system indicated by the pipe terminal, C. The main valve, D, is shown in Figure 1 in closed position; and it may be understood that in the construction as illustrated, the main valve carrying lever, E, is weighted to counterbalance the valve, D, or overbalance it so that in the absence of either water pressure below or super-atmospheric air pressure above the valve, it tends normally to open; but it is not essential to the present invention that the valve should be over-balanced in the direction for opening. The main valve casing, A, is formed with a boss, $A^1$, at the side at which the main valve carrying lever is fulcrumed, said boss being apertured for vent connection. At this aperture there is mounted a disk, $A^2$, having the vent port, $a^2$, which is adapted to be closed by a valve, F, carried by the main valve carrying lever, E, for preventing water discharge through said port, said valve, F, being mounted on said carrying lever at a point immediately back of the pivotal connection of the said carrying lever with the main valve, D, and being pivotally mounted at the point indicated with a limited range of oscillation about its pivot, as indicated by the space, $f$, shown between the back of the valve and the pivot boss, $e^1$, on the lever, E, this range of pivotal movement being suitable for adapting the valve, F, to accommodate itself accurately to the seat, $a^3$, around the port, $a^2$, seating of the valve, F, at that seat occurring when the main valve, D, is carried to open position as seen in Figure 2. The disk, $A^2$, is secured to the boss, $A^1$, by being clamped thereon by the foot flange, $G^1$, of the vent fitting, G. This vent fitting has a lateral discharge indicated by the pipe, H, which may terminate for free atmospheric discharge, or may be connected to the interseat chamber, $A^4$, of the main valve casing, A, as indicated by dotted line pipe connection, $H^3$, shown as a continuation of the pipe, H, in Figures 1 and 2. In the fitting, G, there is mounted for seating at the valve seat, $g^2$, and thereby controlling the vent passage, a valve member, K. This valve member has a stem, $K^1$, which extends through the port through the seat and through the elbow, $g$, leading to the discharge connection, H, said stem being connected by a short link, $K^2$, with a bell-crank lever latch, L, whose longer horizontal arm, $L^1$, constitutes a latch at the end of which there is provided a catch, M, whose catch nose, $m$, is adapted to engage a catch hook, $g^3$, which is carried by the extension, $G^2$, of the fitting, G, which extension also affords a fulcrum at $g^4$, for the lever, L. A substantially horizontally extending arm, $L^1$, of said lever, L, is graduated, and upon said graduated portion there is mounted for sliding a weight, P, which is adapted to be set and secured at adjusted position by a set screw, $p$, for weighting the lever to any desired extent. The catch, M, has an arm, $M^1$, which at engaged position of the catch with the hook, $g^3$, extends off from the fulcrum of the catch so as to adapt the catch to be rocked clear of the hook by the gravity caused movement of the weighted arm whenever the catch nose is released from the frictional engagement with said hook which is due to the pressure of the weighted lever arm.

From this description it will be understood that the weighted lever, connected as described to the stem of the valve, K, will tend, when the catch, $m$, is released from the catch hook, $g^3$, to actuate the valve, K, in opening direction.

The valve stem or valve controlling rod, $K^1$, extends loosely through said valve, K, and is connected with the valve for drawing it toward and holding it at its seat by a spring, S, which is coiled about the stem and stopped between the valve at one end and a nut, T, at the other end which is screwed onto the end of said stem. For sealing the aperture in the valve through which the stem extends loosely as stated, and for a further function hereafter indicated, a disk, $v$, is interposed on the stem between the spring, S, and the nut, T, and a flexible longitudinally extensible and reducible bellows-like sleeve, V, enclosing the spring, S, has its outer end which is interiorly flanged or infolded, clamped between the disk, $v$, and a second disk, $v^1$, interposed on the threaded end of the stem between the disk, $v$, and the nut, as seen in Figure 3, the opposite end of the sealing sleeve, which is exteriorly flanged or folded outwardly making fluid-tight junction with the valve which is most conveniently done by clamping it against the inner side of the valve by means of an exteriorly threaded bushing, W, which is screwed into an annular flange or boss, $K^3$, formed on the valve by rabbeting the same at the inner side to a diameter sufficient to accommodate the folding and corrugating of a sealing sleeve, and said interiorly threaded bushing, $K^3$. The detail construction of the valve, K, in addition to the particulars above described for securing the sealing sleeve to it and to the valve stem is preferably as shown in Figure 3, consisting of two parts, $K^4$ and $K^5$, the part, $K^4$, being rabbeted about the central aperture through which the stem extends loosely, as stated, to accommodate the spring, S, and exteriorly reduced in diameter to form a flange, $k^4$, and exteriorly threaded at the reduced part for having screwed onto it the part, $K^5$, which has the rabbet and interior thread above described for accommodating the expansible and reducible sealing sleeve and the bushing which binds it at the inner end to the valve. The part, $K^5$, has an annular groove, $k^7$, on its face toward the valve seat for receiving a suitably yielding seating annulus, $K^6$, whose inner margin is preferably overhung by the flange, $k^4$, of the part, $K^4$, for retaining it securely in the annular groove.

This construction of the valve indicated as to its entirety by the letter K, it will be understood is designed and adapted to permit the valve to be drawn to its seat by operating the lever arm, $L^1$, from the position shown in Figure 2 at which the valve, K, is open, to a position shown in Figure 1, at which it is seated and may be held seated by the locking of the lever arm, $L^1$, by means of the catch, M, engaging the hook, $g^3$, the valve being held yieldingly to its seat when it is thus seated by the tension of the spring, S, which is compressed in the seating movement described in which also the sealing sleeve, V, is reduced in length or collapsed to a certain extent. At this position it will be seen that the valve stem, $K^1$, may be further thrust outwardly through the vent port controlled by the valve and through the valve itself, and that upon being thus thrust a very short distance sufficient to lift the lever arm, $L^1$, just enough to take the catch, M, out of frictional engagement with the hook, $g^3$, the weighted arm of the catch will drop and swing the catch entirely clear of the hook, leaving the weighted lever $L^1$ arm free to fall and thrust the valve stem inward for releasing the valve, K, from its seat, and for forcing it off its seat. And upon considering the construction and mode of action which is possible as above described, it may be understood that the weighting of the catch, M, so that it tends to release itself by gravity from the catch hook, $g^3$, and the connection of the weighted lever arm, $L^1$, by the valve stem, $K^1$, with the spring, S, through which the valve, K, is yieldingly held to its seat, constitutes means for releasing said valve-locking means, and that the stiffness of the spring, S, which may be varied by adjusting the nut, T, predetermines the resistance to the lock-releasing movement which may be caused by the air pressure of the system. The operation of the device in connection with the dry pipe sprinkler system will be as follows:

The system having been in operation for extinguishing fire, and the water having been shut off, the system drained, the sprinkler heads being closed, and the parts being in the position shown in Figure 2, the operator first sets the main valve at closed position seen in Figure 1, thereby withdrawing the valve, F, from its seat at the vent port, $a^2$, leaving the latter open. The operator will next lift the lever, $L^1$, to position shown in Figure 1 and engage the catch, M, with the hook, $g^3$, thereby locking the lever in that position and locking the valve, K, in seated position to which it was drawn by lifting the lever as described. The operator will then adjust the weight, P, on the lever to a point indicating the degree of pressure in the air pressure region of the system at which the main valve is to be opened for flooding the system, being the degree to which the pressure will fall substantially instantly upon the opening of a single sprinkler head. The system will next be connected with a source of compressed air (connections not shown in the drawing) and the water inlet-controlling valve (not shown) will be opened and the system will then be fully set ready for operation for extinguishing fire upon the opening of a sprinkler head. The force due to the super-atmospheric pressure in the system operating on the area of the disk, $v^1$, exceeding the force exerted on the valve rod by the weighted lever will lift the latter enough to release the catch nose from its frictional engagement with the hook, $q^3$, and the catch will fall, leaving the lever unlocked and operating on the valve rod in the direction for opening the valve, but without opening it so long as the pressure in the system is unreduced; because that pressure operating on the area of the valve which is substantially greater than that of the disk, $v$, against which the thrust of the valve rod under gravity action of the lever operates. But when a sprinkler head is subsequently opened, the pressure in the air pressure region of the system being thereby reduced to such a point that the force of said reduced pressure operating upon the area of the valve, K, is less than the force exerted by the weighted lever, $L^1$, the lever will operate for thrusting the stem inward and opening the valve, K, permitting full vent of the super-atmospheric pressure in the system through the pipe, H.

Instead of venting this pressure to the atmosphere, the pipe, $H^1$, in addition to the free discharge to the atmosphere through the branch, $H^1$, may be connected as shown in Figures 1 and 2 for transmitting the pressure from the pressure region of the system past the open valve, K, to the interseat chamber, $A^4$, of the main valve, where it will operate for counter-balancing or offsetting the air pressure in the air pressure region of the system, that is, at the other side of the main valve, and thereby cause the main valve to open instantly as if the air pressure region of the system had been fully vented. It will be understood that when this last mentioned mode of action is desired, the atmosphere vent must be closed; and for this purpose the branch, $H^1$, of the pipe, H, has a valve, $H^2$, which will be left open when the atmosphere vent is desired, and will be closed when it is desired to offset the system pressure operating above the main valve with the same pressure introduced under that valve. It will be understood that when the structure is operated according to the method last described, there is required means by which the pressure delivered through the pipe, H, shall cut off access of atmospheric pressure to the interseat chamber, which in the regular ordinary operation is obtained through the open drainage port; and for this purpose there is provided a valve, R, carried by a counter-weighted lever, $R^1$, which valve is held normally seated at $h^3$, against the pressure delivered through the pipe, H, and which is adapted also to seat and be held seated at the drainage outlet, $h^4$, when said pressure forces it off of the seat, $h^3$, thus cutting off atmosphere access to the interseat chamber when the pressure from the pipe, H, is admitted to that chamber for the purpose indicated.

I claim:—

1. In a dry pipe sprinkler system comprising a main valve casing and main valve therein controlling the inlet and arranged to be held seated by super-atmospheric air pressure in the system, an exhaust passage leading from the air pressure region of the system; a valve seat in said passage and an exhaust-controlling valve co-operating therewith, positioned for being seated by the system air pressure; and means connected for exerting predetermined pressure, in addition to the atmospheric pressure, on said valve in the direction for opening it operating thereon against the system pressure continuously when said valve is seated, regardless of the degree of variation of said system pressure; whereby said exhaust-controlling valve is automatically opened when the force due to the system pressure for holding the valve seated falls below said predetermined opening force.

2. In the construction defined in claim 1, foregoing, the exhaust passage being positioned leading from a port in the main valve casing; a valve mounted for seating at said port to close the same for preventing water passage therethrough, and adapted to be seated by the movement of the main valve to its open position and to be opened by the movement of the main valve away from said position.

3. In the construction defined in claim 1, foregoing, in combination with the means for automatically opening the exhaust valve, means for releasably locking said opening means at the seated position of the valve, means exposed to the system pressure for movement thereby, connected for causing release of said locking means, and means opposing predetermined resistance to the lock-releasing movement of the release-operating means; whereby the locking means having been engaged for locking the valve at closed position is released when the predetermined pressure is obtained in the system, and the exhaust valve is thereby left free to open upon decline of said system pressure below the degree for holding the valve closed against the predetermined opening force.

4. In a dry pipe sprinkler system, the casing of the air pressure region having an exhaust port; an exhaust valve seated at said port for opening inwardly with respect to the casing, and having its stem extending out through the port; valve opening means comprising a weighted lever fulcrumed and operatively connected with said stem for opening the valve by gravity against the system pressures within the casing; a weight adjustable along the lever for predetermining the limit of pressure against which the valve can be opened by said means.

5. In a dry pipe sprinkler system and the like, in combination with the main valve casing and main valve therein, said casing having an exhaust port, an exhaust valve seating at said port in a direction to be seated by the system pressure in the casing, said exhaust valve having a stem extending out through the port which the exhaust valve controls; exterior means operating on said stem for opening the exhaust valve against the system pressure; yielding means connecting the stem relatively to the valve, said means being exposed on opposite sides to the system pressure and to atmospheric pressure over an area less than the seating area of the valve; a catch operative at the seated position of the exhaust valve for locking said exterior means against valve-opening movement and adapted for automatic release by the movement of the stem relatively to the valve which is provided for by said yielding connecting means and caused by the super-atmospheric system pressure on said yielding means.

6. In a dry pipe sprinkler system, the air pressure region of the system having an exhaust connection, a valve controlling said connection positioned for being seated by the system pressure; means operating with predetermined force for opening the exhaust valve against the system pressure; releasable locking means for restraining said force-exerting means, lock-releasing means comprising a part oppositely exposed to said pressure and atmospheric pressure and connected for effecting lock release by movement due to excess of system pressure over atmospheric pressure; the locking means requiring for its release more force than that predetermined for opening the valve against the system pressure.

7. In the construction defined in claim 6, foregoing, the movable part operated by excess of system pressure over atmospheric pressure, being connected to the valve opening means for opposing the valve opening action of said means in releasing the locking means; whereby any change in the predetermined valve-opening force causes like change in the resistance of the locking means to release, and the required relation between the two forces is preserved.

In testimony whereof, I have hereunto set my hand at Chicago, Illinois, this 6th day of April, 1925.

EMIL TYDEN.